United States Patent [19]
Willetts

[11] Patent Number: 4,597,337
[45] Date of Patent: Jul. 1, 1986

[54] LOW PROFILE INTERMODAL TRANSPORT SYSTEM

[76] Inventor: Elwood Willetts, 102 S. Pentaquit Ave., Bay Shore, L.I., N.Y. 11707

[21] Appl. No.: 614,741

[22] Filed: May 25, 1984

Related U.S. Application Data

[63] Continuation-in-part of Ser. No. 567,967, Dec. 23, 1983, which is a continuation of Ser. No. 390,533, Jun. 21, 1982, abandoned.

[51] Int. Cl.⁴ .................. B61D 17/00; B61F 3/00
[52] U.S. Cl. ...................... 105/4 R; 105/189; 105/218 A; 267/57; 267/152; 280/131
[58] Field of Search ............ 105/182 R, 200, 4 R, 105/3, 189, 218 A, 197 T; 267/3, 57, 154, 152; 280/81 R, 86, 130, 131, 717; 410/53-55, 44, 45, 90

[56] References Cited

U.S. PATENT DOCUMENTS

| | | | |
|---|---|---|---|
| 1,654,814 | 1/1928 | Jonkhoff | 105/4 R |
| 2,036,535 | 4/1936 | Nelson | 105/4 R |
| 2,782,028 | 2/1957 | Hirst | 280/717 |
| 3,013,808 | 12/1961 | Willetts | 267/57 |
| 3,473,797 | 10/1969 | Selzer | 267/57.1 R |
| 3,777,672 | 12/1973 | Schneider | 267/3 |
| 4,013,016 | 3/1977 | Willetts | 105/199 R |
| 4,356,775 | 11/1982 | Paton et al. | 105/182 R |
| 4,416,571 | 11/1983 | Krause | 105/4 R |

FOREIGN PATENT DOCUMENTS

| | | | |
|---|---|---|---|
| 806889 | 5/1936 | France | 267/57 |
| 2234167 | 2/1975 | France | 410/90 |

*Primary Examiner*—Robert B. Reeves
*Assistant Examiner*—Donald T. Hajec
*Attorney, Agent, or Firm*—Nolte, Nolte and Hunter

[57] ABSTRACT

A low profile intermodal transport system including a tandem axle rail car truck with frame supported by a torsionally strained elastomer bonded between concentric hubs, each hub integral with an oppositely extending horizontal torque arm, and all (of above) disposed concentrically of a roller bearing journal box; two centerplates per car truck, a vertically extending kingpin centered in each, one centerplate shaft mounted, the other mounted on a pair of crankshafts with a torsionally resistant elastomer bondedly interconnecting the transversely extending crankpin (of each crankshaft) and the underside of the centerplate thereover; a vertically engaged, draft resistant cradle, interchangeably supporting a sea container or the body of a highway trailer (of the same length), interconnects the shaft mounted centerplate (at the kingpin) of one truck with the adjacent crankshaft mounted centerplate of a separate rail car truck. At each end of the train and A.A.R. coupler on the end of the centerplate frame, supplants the shaft mounted centerplate, and the crank mounted centerplate is moved to the midlength of the wheel base. A significant economy over known rail transport systems results.

8 Claims, 10 Drawing Figures

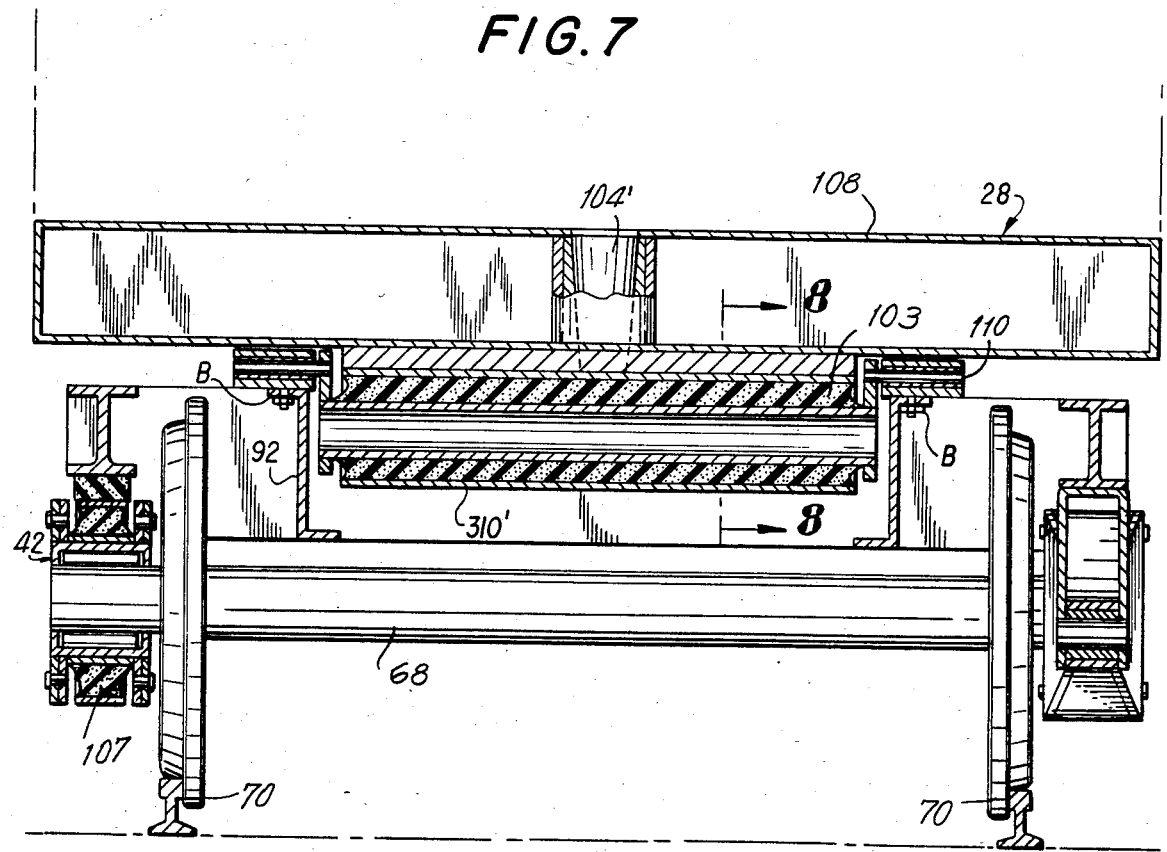
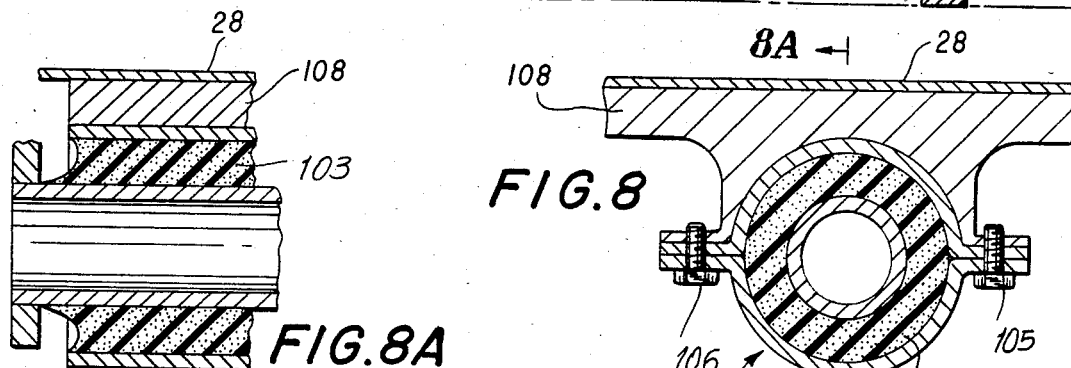
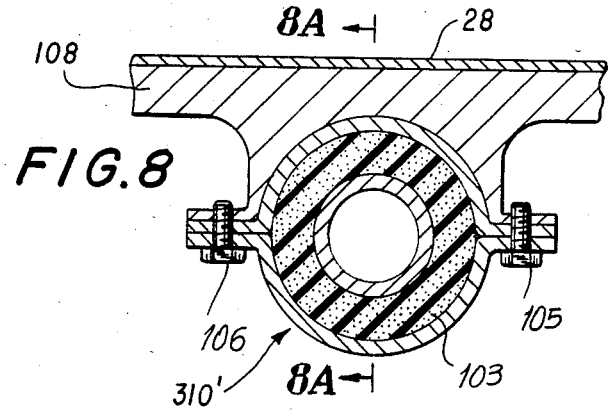
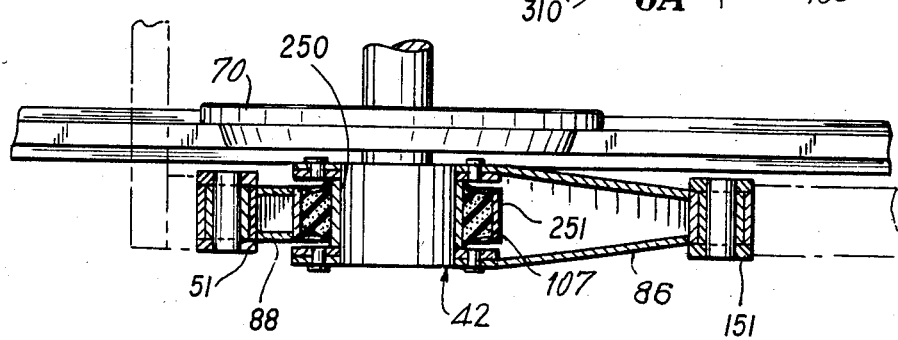

LOW PROFILE INTERMODAL TRANSPORT SYSTEM

RELATED APPLICATIONS

This application is a continuation-in-part of my co-pending U.S. patent application, Ser. No. 567,967, filed Dec. 23, 1983, entitled INTERMODAL TRANSPORT SYSTEM, which is a continuation application to my U.S. patent application, Ser. No. 390,533, filed June 21, 1982, now abandoned.

FIELD OF THE INVENTION

The present invention relates generally to the field of intermodal rail highway transport and more specifically to a low profile intermodal transport system characterized by significant economic advantages over conventional transportation systems and having a pronounced low profile permitting transport throughout the U.S. rail system.

BACKGROUND OF THE INVENTION

The need for an efficient and economic intermodal transport system has been recognized throughout the rail industry, but to date a system does not exist which can provide the many advantages inherent in the instant invention. One type of system, described in U.S. Pat. No. 4,385,857 to the instant inventor, is directed to an intermodal transport system and provides many advantages previously unrecognized by the rail industry. In the system described in U.S. Pat. No. 4,385,857, damage free shipments with reduced loads per axle and unrestricted main line clearances through tunnels are facilitated by method and apparatus which utilize an intregal interchange where trailer containers, whose adjacent ends are supported vertically for linehaul at upstanding king pins, integral with centerplates suspended in tandem axle rail support trucks, are assembled into, or broken from train formation to transfer containers and trailers by means of elevating shuttle means.

In that system, trailer containers are transported over rail on a plurality of rail trucks, with each container being supported by centerplates on each of the rail trucks and the containers interfacing with the centerplates through upstanding king pins to provide easy assembly into a train formation configuration. The system described in U.S. Pat. No. 4,385,857 eliminates the necessity for utilizing flat cars to transport trailer containers and utilizes a unique suspension system which permits damage free shipments with the most fragile cargo.

Notwithstanding the advantages provided by the system described in U.S. Pat. No. 4,385,857 that system does require an interchange facility for operation. The present invention takes advantage of the teachings in this U.S. Patent, but eliminates the necessity to utilize a different, and currently not existing, interchange system. Rather, the present invention utilizes standard ground based cranes which have been in use for a number of years in the Piggyback system for transferring highway trailer containers, and/or ship containers, to rail transportation. With a lift crane at every interchange, car coupling is accomplished vertically, instead of horizontally, as obtained with a standard jaw coupler, with the exception of the ends where the locomotive and caboose are attached. In addition, the system described in U.S. Pat. No. 4,385,857 requires fifteen foot height for operation, which is an improvement over the seventeen foot overhead clearance required for flt car operations, but still would not be able to operate on locations with overhead clearances being less than the fifteen feet. The instant invention substantially reduces the overhead clearance necessary for rail transport of trailer containers.

It is, therefore, a general object of the instant invention, to provide a train of low profile intermodal rail hardware which only requires an overhead clearance of approximately thirteen feet, six inches.

It is another object of the instant invention to provide an intermodal transport system which utilizes standard ground based lift cranes for interchange of sea or highway containers to rail lines, but yet provides significant economic advantages over the present Piggyback system.

It is a further object of the instant invention to provide an intermodal transport system wherein the use of jaw couplers is not required (except at train ends) and wherein novel support structure couples the ends of rail trucks together, provides slack for starting the train, absorbs buffing shocks and prevents torsional strains.

SUMMARY OF THE INVENTION

A low profile intermodal transport system for linehaul by rail, including a rail support truck having first and second centerplates with vertically extending kingpins centered on each centerplate, and a rail coupler truck having a single centerplate with a vertically extending kingpin centered thereon.

It is an advantage of the instant invention that a draft cradle includes a cross bolster mounted at opposite ends of a draft sill, the cross bolster having a female receptacle for vertical engagement to separate and adjacent rail trucks with said upstanding kingpins whereby support is provided for both highway trailer containers and ship containers.

It is another advantage of the instant invention that the highway trailer containers transported with the instant system have the chassis removed prior to loading on the draft cradle, thus insuring that ship containers and highway trailer containers are of the same height during transport thereby minimizing wind resistance and saving substantial energy.

It is a feature of the instant invention that a journal box is mounted at each end of each axle on said rail trucks and the journal box includes a cylindrical axial extension on which is mounted a torque reactive spring means having oppositely extending torque beams supporting the rail truck frame, thereby providing an extremely low profile rail transport system.

It is another feature of the instant invention that couplers are only required at train ends and each rail support truck includes two centerplates per truck, one crank mounted, the other shaft mounted, each with a vertically extending kingpin centered therein, and a draft cradle vertically engaging the crank mounted centerplate of one truck, with the adjacent shaft mounted centerplate of a separate truck, whereby all draft forces are transferred by said draft cradle.

It is still another feature of the instant invention that the draft cradle contains locking means at each corner for securing to the draft cradle a highway container, or a sea container.

It is another feature of the instant invention that each rail truck supports train air brake means including air brake hoses supported on the draft cradle, the breaking means further including connections for air brake hoses to the rail car trucks and to other adjacent draft cradles.

It is still a further feature of the instant invention that the torque reactive spring means includes a hub which is pressed axially over the tubular exterior of the journal box and the hub contains an elastomer bondedly stressed intorsional shear member which reacts with extending torque arms connected to the support frame of the rail car truck.

It is still another feature of the instant invention that one center plate on the rail support truck and the single center plate on the rail coupler truck, are supported by two torsionally restrained crankshafts disposed symmetrically fore and aft of the vertically extending kingpins, while the second center plate on the rail support truck is attached by a single cross shaft affixed to a centerplate frame on the rail truck.

It is a still further feature of the instant invention that the pair of crankshafts are mounted on eighteen inch centers and are bushed in a single bracket on a zee bar top flange, with a crank web extending down between the zee bar and the side of the centerplate to the transversely extending crankpin, on which the centerplate is supported for movement thru an arcuate path resulting from draw bar horizontal forces on the upstanding kingpin intregally centered in each centerplate.

It is another feature of the instant invention that the vertically engaged draft cradle, which serves to make up, or break up a train, is comprised of a tubular centersill with a bolster at each end and a female receptacle centered preferably 18 inches from the sill end for vertical engagement with the upstanding kingpin centered in the centerplate.

It is a further feature of the instant invention that oppositely extending torque arms integral with concentric hubs are restrained by torsional shear to resist deflection of the sprung mass, with the free ends of the torque arms being bushed in rubber and bracketed to the full length truck frame.

It is a further feature of the instant invention that the sole metallic contact between the axle and truck frame is the journal bearing, as lubrication-free elastomers interconnect the opposing torque arms to frame brackets, while a rubber bumper pad under the frame limits deflection at the journal box.

The foregoing and other objects and features of the instant invention will be more fully understood from the following description of an illustrative embodiment thereof taken in conjunction with the accompanying drawings.

BRIEF DESCRIPTION OF THE DRAWINGS

In the drawings,

FIG. 7 is a fragmentary section view of the system taken along the plane of line 7—7 of FIG. 5, FIG. 8 is a sectional end view of the system taken along the plane of 8—8 of FIG. 7, FIG. 8A is a sectional end view of the system taken along the plane of 8A—8A of FIG. 8, and FIG. 9 is a sectional top view of a portion of the system taken along the lines 9—9 of FIG. 6.

DETAILED DESCRIPTION

The invention pertains to the transport by rail of two different types of conveyances, a container normally transported by sea and a highway trailer with the chassis removed. Removing the chassis from the highway trailer results in the two different conveyances having uniform height, making possible an extremely low profile intermodal transport system. The highway trailer, with the chassis removed, will be referred to hereinafter as a contrailer.

The system employs a rail support truck supporting two centerplates, one centerplate mounted on a pair of torsionally restrained crankshafts to cushion train draft impacts while the other centerplate is secured to the truck frame with a single cross shaft over the axle of the car truck. The system also includes a rail coupler truck supporting a single centerplate having attached thereto a standard jaw coupler for connection to a locomotive or a caboose. Each centerplate on each car truck has an upstanding kingpin designed for vertical engagement with a draft cradle.

The draft cradle, capable of interchangeably supporting and securing a contrailer, or sea container of the same length is supported at one end by the cradle pivotally engaging the kingpin of the centerplate mounted on the dual crankshafts described above. The other end of the draft cradle interconnects with the centerplate supported by the single cross shaft on an adjacent rail truck, or alternatively is supported by the rail coupler truck, if the cradle is mounted on the end of the train. The system, as described below, is entirely free of dependence on the standard jaw coupler, except at train ends, permitting spring deflection for each of the car trucks to be increased beyond the three inch limit imposed by the standard jaw coupler, thus permitting transport of a combination of more fragile cargo.

Each draft cradle includes snap lock fittings, at each corner to provide an interlock with the container or contrailer during shipment. The proposed intermodal transport system, of a singularly low profile, saves the expense of hauling the chassis of a highway trailer body by rail in that the trailer body is moved without its chassis. Interchange between highway or shipboard, and the rail transport system is accomplished with the same lift cranes now used in the Piggyback system which is widespread throughout the U.S. Removing the trailer chassis not only avoids the approximate three tons of trailer chassis weight, but also substantially decreases wind resistance during transportation in that the sea containers are now of the same height as the highway contrailers. Details of the energy savings of the instant invention will be described below.

Of particular significance is that the height of the loaded freight transport system described by the instant invention using contrailers is limited to thirteen feet, six inches, permitting access to the complete U.S. rail system.

Figure 1:
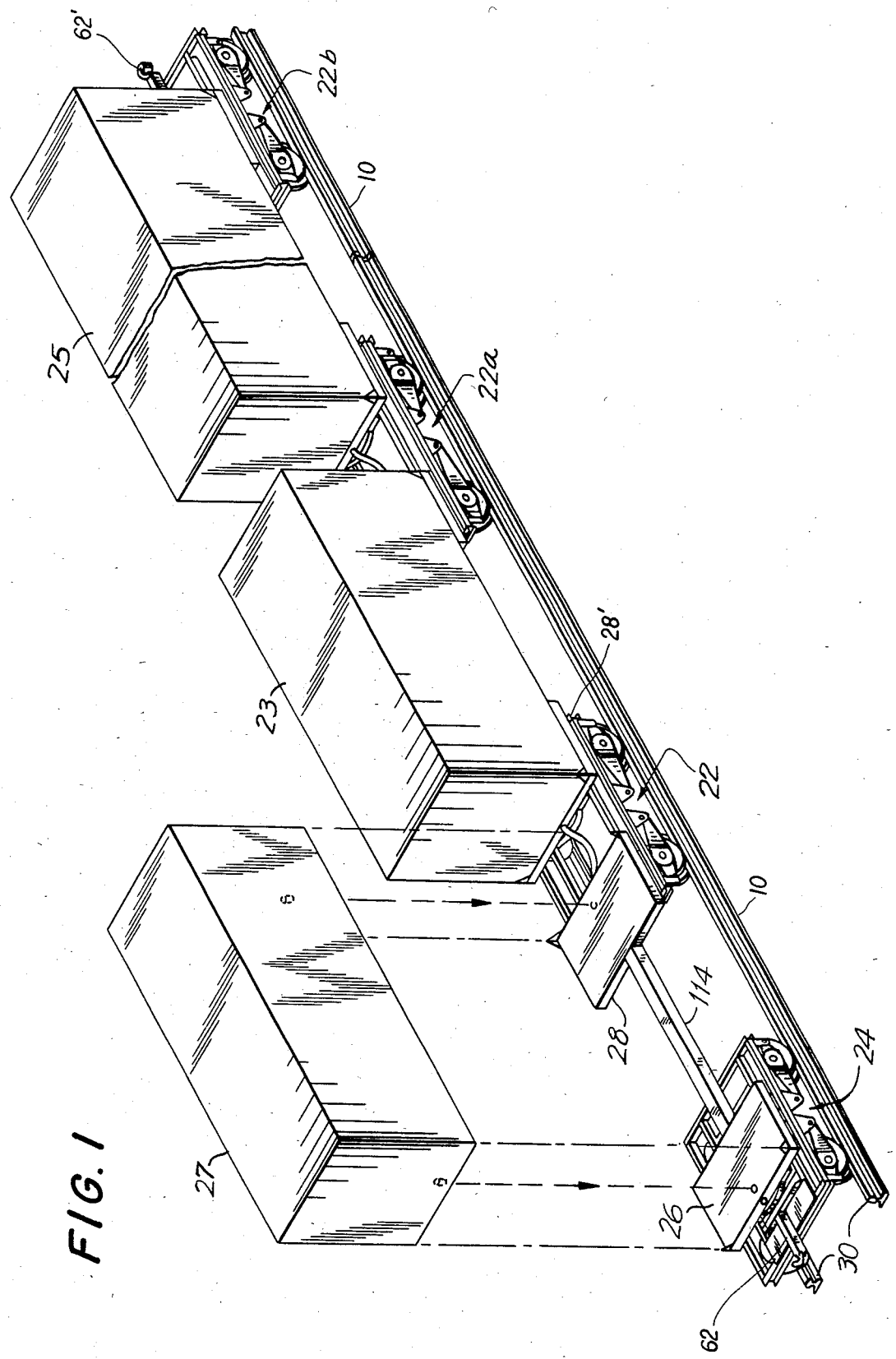
FIG. 1 is a perspective view of the intermodal transport system of the instant invention showing a rail coupler truck and two rail support trucks in tandem mounted on rails to form a train and supporting a series of containers.

Referring now to FIG. 1, there is shown an example of the low profile intermodal transport system of the instant invention. More particularly, there are shown in FIG. 1, three containers/contrailers, 23, 25 and 27. Container 23 is supported on one axle of rail support truck 22 and an adjacent rail support truck 22a. Container 25 is supported by the other axle of rail support truck 22a and an adjacent axle of rail coupler truck 22b. Container 27, as shown by the arrows, is being placed on a support provided by the other axle of rail support truck 22 and the centerplate 26 of rail coupler truck 24. Wheels 10 on each truck are mounted on a pair of parallel spaced rails 30. Also shown in FIG. 1 are standard jaw coupler 62, 62' attached to the forward end of rail coupler truck 24 and the rear end of rail coupler truck 22b.

The draft cradle upon which container 27 is being placed consists of cross bolsters 26 and 28 connected by draft sill 114 which interfaces with the rail support and coupler trucks in a manner to be described below.

Figure 2:
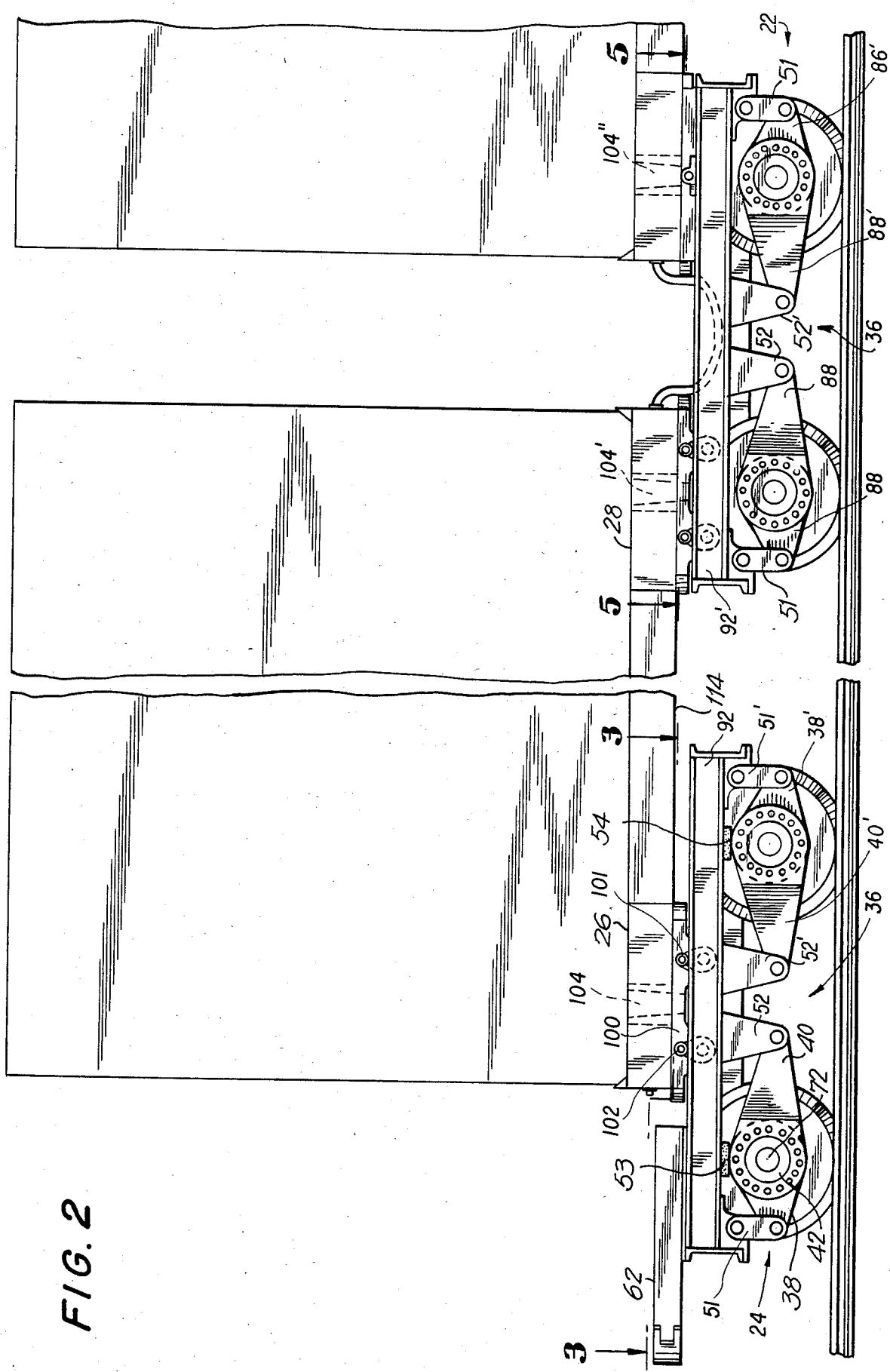
FIG. 2 is a side elevation view of a rail coupler truck and rail support truck portion of the inventive system.

Referring now to FIG. 2, there is shown a more detailed side view of rail coupler truck 24 and rail support truck 22. Each rail truck, as described in greater detail below, includes a torque reactive suspension means 36 located at opposite lateral sides of each rail truck. This torque reactive suspension means 36 is of a type similar to that disclosed in U.S. Pat. No. 3,171,668 granted to the same inventor in the instant application and serves to isolate rail induced excitation from the sprung mass. The teachings of U.S. Pat. No. 3,171,668 are hereby incorporated herein by reference and the detail described and shown in U.S. Pat. No. 3,171,668 will not be repeated herein.

In each suspension means 36, opposing torque arms 38,38' and 40, 40' of coupler truck and 86, 86', 88, 88' of support truck are interconnected through an elastomeric bushing included within hub 42. Hub 42 is press fit over journal box 72 and bonds the opposing torque arms 38, 38' and 40, 40' at the hub with an elastomeric bushing (107 in FIG. 4) of infinite length, i.e., endless, in the present instance, circular, to resist transverse forces at the end of the opposing torque arms. Hub 42 is shown in greater detail in FIG. 7 and will be subsequently described. The ends of the torque arms are in turn connected to the main frames 92, 92' of the rail truck via shackles 51, 51' and 52, 52' as shown in FIG. 2. Bumper pads 53, 54 prevent undue deflection in the coupler truck main frame when loaded. The suspension means 36 is described in detail in U.S. Pat. No. 4,013,016 and U.S. Pat. No. 3,171,668, both of which are incorporated herein by reference and thus greater detail describing the suspension means will not be provided herein.

Figure 3:
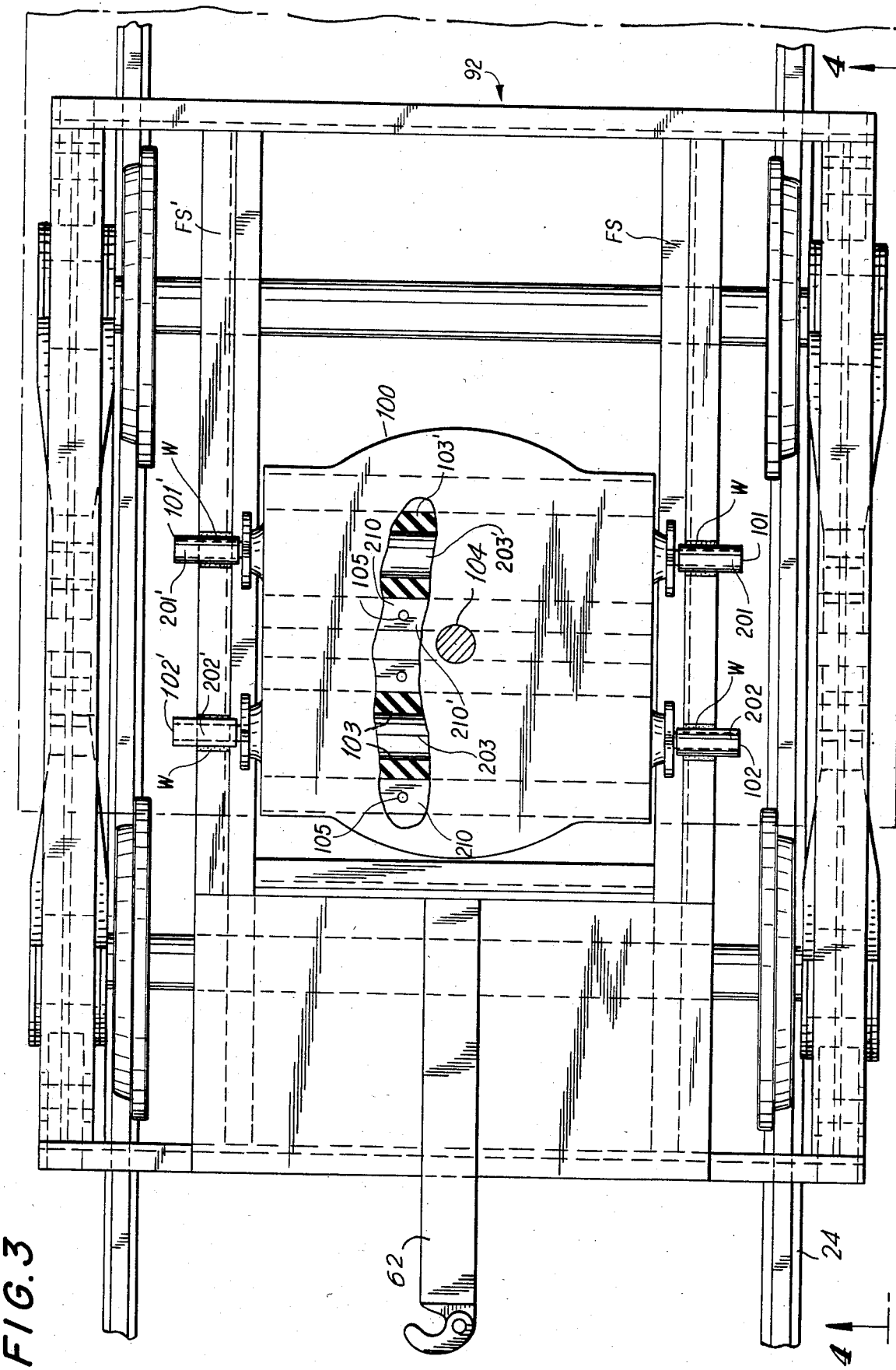
FIG. 3 is a top plan view of a rail coupler truck portion of the inventive system.
Figure 4:
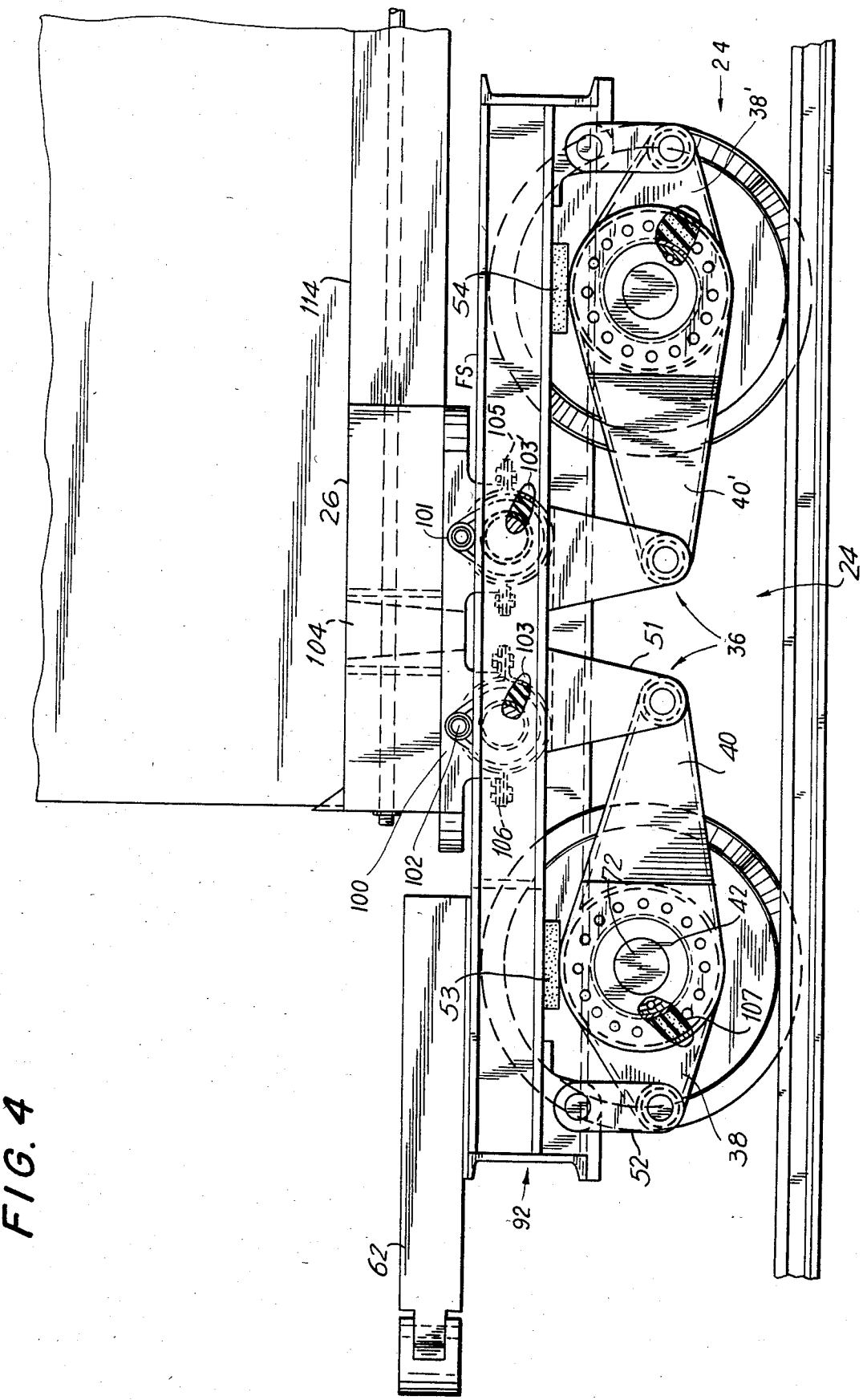
FIG. 4 is a side elevation view of a rail support truck portion of the inventive system.

Referring now to FIGS. 3 and 4, there is shown a more detailed illustration of rail coupler truck 24. Rail coupler truck 24 is provided with a single centerplate 100 supported by twin crankshafts 101, 101' and 102, 102' on frame sills FS, FS' of main frame 92. Each crankshaft is seated for rotation in a bearing 201, 202, 201', 202' secured on the main frame sills, or bolsters as they are called, by weldment as shown in FIG. 3 at W, although they may be secured by any conventional form of securement as, for example, bolts B which are shown in FIG. 7 to secure the crankshaft 110, 110', 111, 111' of the centerplate 108 to the sills in the main frame of support truck 22. Each crankshaft is torsionally restrained by elastomer bushings 103, 103' surrounding and bonded to crank pins 203, 203' in coupler truck (FIG. 3), 303, 303' in support truck (FIG. 5) and disposed evenly fore and aft of kingpin 104. Cross bolster 26 contains a female receptacle which vertically accepts kingpin 104 as shown in FIG. 4. Each crankshaft bushing is also bonded to the inner surface of a flanged split concentric hub 210, 210' in coupler truck (FIG. 3), 310, 310' in support truck (FIG. 5) which is secured to centerplate 100 by bolts such as bolts 105 and 106 which maintain the positions of elastomer bushings 103, 103'. FIG. 4 also shows opposing torque arms 38 and 40 in greater detail along with hub 42 and elastomer bushings 107.

Figure 5:
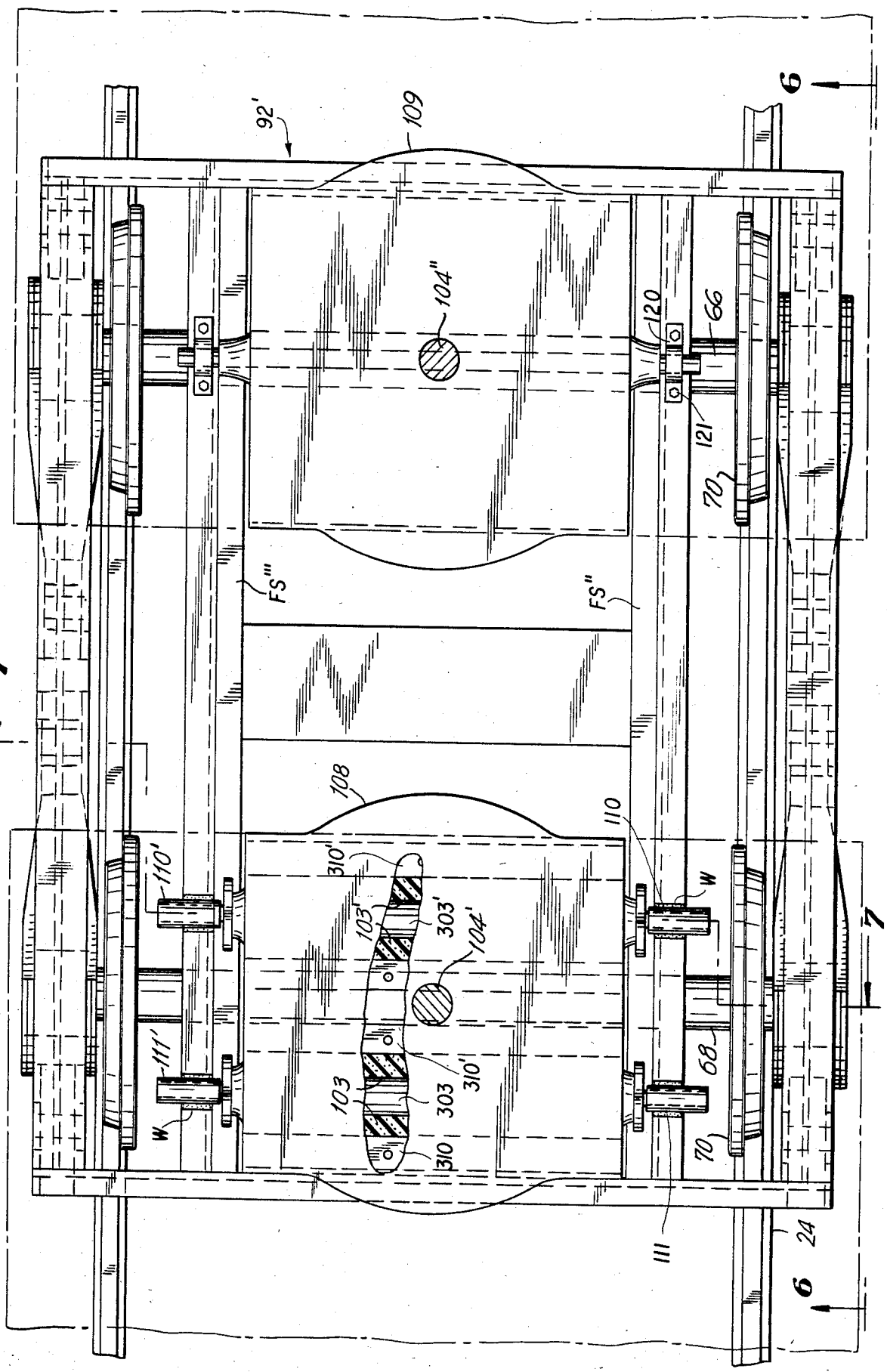
FIG. 5 is a top plan view of a rail support truck portion of the inventive system.
Figure 6:
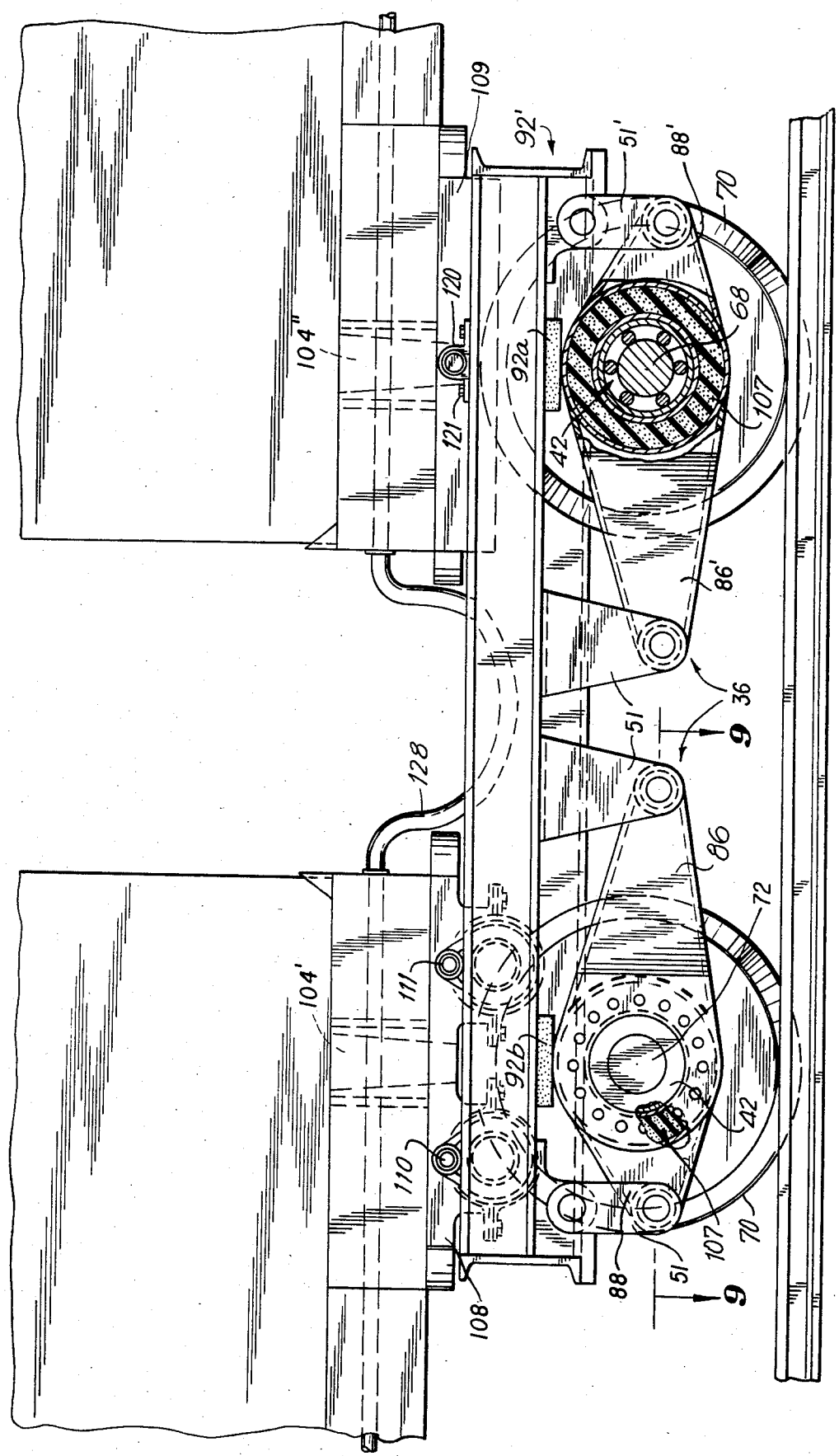
FIG. 6 is a fragmentary side view of a portion of the system.

Referring now to FIGS. 5 and 6, there is shown a top and side view of rail support truck 22. Rail support truck 22 is provided with a pair of centerplates 108 and 109 with center plate 108 being vertically aligned with axle 68, and centerplate 109 being vertically aligned with axle 66. Each center plate has an upstanding kingpin 104', 104'' extending upwardly therefrom to be received by an inset female receptacle in a cross bolster 28, 28' of the draft cradle as described above. One of the centerplates will support the cross bolster 28 at the rear end of the draft cradle, while the other centerplate will support the cross bolster 28' at the forward end of the following draft cradle.

Frame sills FS'', FS''' of the main frame 92' of rail truck 22, support centerplate 108 on twin crankshafts 110 and 111. As shown, each of crankshafts 110 and 111 are torsionally restrained by elastomer bushings 103 and disposed evenly fore and aft of kingpin 104' in the same manner as the crankshafts on rail coupler truck 24. It is understood that each centerplate supporting crankshaft must be designed to provide sufficient combined resistance against draft impacts. Centerplate 109, shown in FIGS. 6 and 7, is supported on frame sills FS'', FS''' by a single cross shaft attached to frame 92 with bolts 120, 121.

Also shown in FIG. 6 are suspension means 36, which have been previously described in connection with rail truck 24. The suspension means is mounted on the outside diameter of the journal box 72 at the end of each axle with a press fit. Opposing arms 86, 88 and 86', 88' of the suspension means 36 are affixed to the truck main frame 92' and bumper pads 92A and 92B are included to prevent undue deflection of the truck main frame when loaded.

Train air brakes of either the disc type, or the conventional, shoe contacting wheel type may be connected to each rail truck and operate on flanged wheels 70. An air brake hose is illustrated in FIG. 6 at 128. As described above, each corner of the draft cradle contains a twist lock (not shown) for engagement with an appropriate container or contrailer of the same length. Such twist locks are in standard use throughout the industry for transporting sea containers and thus will not be described in detail.

Cushioning of draft forces and slack for starting the train, is provided by gravity load on the crank mounted centerplate of each rail truck and by the torsional resistance in the tubular elastomer bonded by interconnecting concentric surfaces of the crankpin and the underside of the centerplate. The draft forces are transmitted thorough draft sill 114 of the draft cradle, to the upstanding kingpins and from there to the frames of the rail support trucks and to companion center plates in adjacent rail trucks. The bolsters of each draft cradle are identical so that contrailers may be loaded in either direction. Inertia of the sprung mass is cushioned from tranverse impacts of the car wheels engaging curved track rails by support of the center plate in torsional restrained shackles (not shown) at ends of the truck main frame. Such shackles are a product of B.F. Goodrich Company.

It is understood that, in accordance with the teachings in U.S. Pat. Nos. 4,013,016 and 3,171,668, axial deflection between the axle and the main frame, or between the main frame and the centerplate will be damped by torsionally restrained shackles.

More particularly, between axle and frame, and as best seen in FIG. 9 the load resistant bonded collar 107 interconnecting the concentric hubs 250, 251 of the spring means is stressed axially by the short arm 38 of coupler truck 24 (FIG. 2), 88 of support truck (FIG. 6); integral with the outer hub 251 (FIG. 9), being secured at its free end to a torsionally restrained shackle, referenced 51 in FIGS. 2, 6 and 9 supporting the main frame thereover; while the opposing (long) torque arm, 40, 40' of coupler truck (FIG. 2), 86, 86' of support truck (FIG. 6), comprises a torsionally restrained hinge comprising the innermost hub 250 of the spring means, while angularity at arm end is absorbed in the rubber bushing at frame brackets 51 of coupler truck (FIG. 2), 51' of support truck (FIG. 6) bracket (toward midlength of main frame). Also where axles and main frame function in fixed relationship, the transverse motion, between centerplate on which spring load is supported, and axle-main frame position, is damped by supporting the centerplate in torsionally restrained shackle (not shown) attached to main frame.

FIGS. 7 and 8 provide greater illustrative detail of the manner in which elastomer 103 surrounds the crankshafts supporting the centerplates and the arrangement of elastomer 107 in hub 42.

FIGS. 8 and 8A further illustrate the manner in which a crankshaft and its associated centerplate is secured by bolts 105 and 106.

In operation, a train is formed as shown in FIG. 1, by providing a rail truck 24 at one end of the train, followed by a series of rail trucks 22, 22A, 22B and so forth, each interconnected by vertically engaged draft cradle. Mounted thereon by lift crane are the highway containers and/or the sea containers. This continues for the length of the train until the end or a second truck 24 is employed to permit hooking of an engine, and/or a caboose to both ends of the train.

It has been learned that extensive energy savings are possible through use of the instant invention. These savings result from eliminating the chassis from the highway trailers during shipment, reducing wind resistance as all units and contrailers are of the same height and, of course, substantially reducing the tonnage being moved, in that the heavy freight cars used in the Piggyback and other systems has been completely eliminated by the instant invention. Extensive analyzis has been performed to document the savings possible with the proposed system and those savings are set forth below and compared with the standard Piggyback system in use througout the U.S. As shown by the following, substantial savings are possible through use of the instant invention.

First, a cost analysis will be given to determine the costs of the instant invention and then a comparison will be shown for the Piggyback system.

For the instant invention, weight of the car truck with draft cradle is 10,000 pounds, with 28 inch wheels. The average load of 2,184 miles thereon=a container @65,000 lbs. or a CONTRAILER @65,000 pounds highway legal weight less 6,000 lbs. chassis=59,000 lbs., for an average of 62,000 pound load, PLUS 10,000 lbs. hardware=72,000 lbs. With roller bearings, ROLL resistance=5 lbs. per ton, thus 36 tons×5=180 tons (×4,840 f.p.m. and divided by 33,000 ft. lbs.=26.4 draft H.P. @55 m.p.h. (ROLL).

Wind resistance, at adjacent ends of cars, 2.5 feet apart, with wind resistance @0.3 lbs. per sq. ft. per foot of gap, on the 9'-6" height of the CONTRAILER and of some of the containers, average=9.0×8 (ft. wide)=72 sq. f.×(0.3×2.5=)0.75 lb.=54 lbs.

Assuming the worst condition, which may neither be created nor prevented, wherein a 9'-6" CONTRAILER is loaded alternately behind an 8'-6" high container, whereat a 1×8 foot projection obtains at each alternate unit, thus resistance=8×9.075 p.s.ft.=72.6 lbs. divided by the adjacent 2 units=36.3 lbs. per unit.

Assume 10" draft cradle as 1 foot high×8 ft. wide=8×0.75 lbs.=6 lbs.

And at truck ends, where the pressure is 9.075 p. sq. ft. the exposed area=1×4 ft. @ centerplate zee bar frame PLUS 1×7 @ cross sills, etc.=11×9.075=100 lbs.; for a combined resistance of 54+36.3+6+100=196.3 lbs.=28.79 draft HMP (WIND).

Combined resistance=26.4 (ROLL) and 28.79 (WIND)=55.19 draft H.P. resistance per unit.

The 2,670 draft H.P. locomotive can thus draw 2,670 divided by 55.19=48.37 units per trip.

The cost of locomotive, 3 man crew and caboose @2.21894 divided by 48.37=$0.045874 per mile×2,184 miles=$100.19 per trip.

Cost of energy @$1.00 per gallon=$3.5454 divided by 48.37=$0.073297 per mile=$160.08 per trip.

The cost of Hardware (car) @$1.25/lb.×10,000 lbs. per unit hauled=$12,500 (investment)×15.55 percent=$1,943.75 annually divided by 45 trips=$43.19 per trip.

Accessories for the instant invention (as for the Piggyback system) include a sea container which is owned by the railroad, which has no investment therein. Otherwise, a system interchangeably using containers (and trailers, as Piggyback) or CONTRAILER (as here) would assess ½ the cost of trailer body ($6,000 divided by 2=) $3,000, and all of the cost of the chassis at $6,000 (because it serves both container and CONTRAILER) for a combined investment of $9,000 per unit. Annual cost @15.55 percent=$1,399.50 divided by 45 trips=$41.10 per trip.

Crane service at interchanges is herein assumed at $5.00 per lift×4 lifts per round trip=$20.00 per unit trip.

Combined cost as above $354.56 per trip=$0.1624 per unit mile.

The above cost represents the worst possible loading sequence of 8'-6" high and 9"-6" high units. A similar comparison was performed for the Piggyback system to depict the average of worst and best results of a loading sequence with 8'-6" ship containers and 13'-6" highway trailers. As an average was taken for the Piggyback system, while worst case given for the instant system, the cost savings set forth in the following summary would in reality be generally more favorable than actually depicted.

| PIGGYBACK | CONTRAILER | SUMMARY RAIL LINEHAUL BIMODAL-CONTAINER-TRAILER |
|---|---|---|
| 102,450 | 72,000 | LOADED RAIL WT. LBS. |
| 95. | 55.19 | DRAFT HORSEPOWER PER UNIT |
| 28.1 | 48.37 | NUMBER UNITS PER LOCOMOTIVE TRIP |
| $ | $ | COSTS PER TRIP |
| $172.46 | $100.19 | LOCOM. 3 MEN & CAB @ $2.21894 MILE |
| $275.56 | $160.08 | ENERGY @ $3.5454 PER LOCO. MILE |
| $103.53 | $43.19 | RAIL HARDWARE-CAR |
| $41.10 | $41.10 | ACCESSORIES-CHASSIS-TRAILER |
| $20.00 | $20.00 | CRANE SERVICE |
| $602.05 | $354.56 | COMBINED COST PER TRIP (2184 MIL.) *re Piggyback |
| $0.27566 | $0.1624 | COST PER MILE |
| 1.698X | 1.00 | RELATIVE COST PER MILE OR TRIP |
|  | 247.49 | SAVES CONTRAILER SAVING PER TRIP |
| $791,968,000 |  | SAVES CONTRAILER ANNUAL SAVING @ 3.2 MILLION |
|  | 115.48 | SAVES DIESEL-GALS. SAVED BY CONTRAILER PER TRIP |
| 32,830,134 |  | SAVES CRUDE OIL (42 GAL.) BARRELS SAVED ANN. BY CONTRAILER ANN. |
| — | — | INVESTMENT IN TRAIN-PER UNIT |
| $32,028.07 | $18,607.57 | LOCOMOTIVE @ $900,000 |
| $711.74 | $413.48 | CABOOSE @ $20,000 |
| $29,960.00 | $12,500.00 | HARDWARE - CAR |
| $8,825.00 | $9,000.00 | ACCESSORIES-CHASSIS-TRAILER |
| $71,524.81 | $40,521.05 | COMBINED INVESTMENT PER UNIT |
| 1.765 | 1.00 | INVESTMENT RATIO |
| 16'-2" | 13'-6" | HEIGHT OVER RAIL |

The above illustrates that the instant invention, by substantially reducing the amount of hardware that must be transported by the locomotive, as well as substantially reducing the wind resistance during transport, results in significant economy over known rail transport systems.

The foregoing disclosure and description of the invention is illustrative and explanatory thereof and various changes in size, shape and materials, as well as in the details of the illustrated construction may be made within the scope of the appended claims without departing from the spirit of the invention.

I claim:

1. In a rail train comprising the combination of a plurality of rail trucks having respective main frames, spring means for mounting said frames on rail wheel supported axles, journal means disposed on the ends of said axles, said spring means being interposed between said main frames and said journal means, centerplates each with a respective vertically extending king pin supported on said trucks and draft cradle means for interconnecting respective centerplates of separate rail trucks through their respective king pins and for securing cargo loads thereon;

the improvement comprising:
crank means for mounting at least one of said centerplates on a main frame of at least one of said rail trucks, said crank means including torsion means between said centerplate and said main frame for absorbing draft and slack start forces in said train.

2. In the real train of claim 1, including at least three rail trucks, at least two of said rail trucks each comprising a coupler rail truck with a standard jaw coupler at one end thereof;

the improvement further comprising:
separate said crank means for mounting at least one of said centerplates on each main frame of each said coupler rail trucks;
at least one of said rail trucks comprising a support rail truck having two said axles and having two said centerplates, each with a vertically extending kingpin and each disposed over a respective axle; crank means for mounting at least one of said centerplates on a respective main frame of a said support rail truck, said crank means including torsion means between said centerplate and said main frame of said support rail truck for absorbing draft and slack start forces in said train.

3. In the train of claim 2, wherein there are provided shaft means for securing the other of said two centerplates on said main frame on said support rail truck.

4. In the train of claim 1, wherein said crank means comprise at least one crank pin extending parallel to said axles, said torsion means comprising an elastomer surrounding said at least one crank pin and bonded thereto, the outer circumferential surface of said elastomer being bonded to means integrally connecting said at least one of said centerplates, said crank means further comprising shaft elements, means for supporting said shaft elements on a respective main frame of a respective rail truck, and means extending between and integrally connecting said shaft elements and said crank pin.

5. In the train of claim 1, wherein said crank means comprise two such crank pins and associated elastomers and shaft elements disposed substantially equidistantly fore and aft of a respective king pin.

6. In the train of claim 1, wherein said spring means comprise torsion means mounted concentrically of a respective journal means and transversely of a respective wheel.

7. In the train of claim 6, wherein each said spring means further comprise a pair of torque arms respectively extending fore and aft of a respective axle and interconnecting said torsion means at their inner ends and said main frame at their outer ends.

8. In the train of claim 6, wherein said journal means is cylindrical and said torsion means comprise an elastomer bonded at its inner surface to a first hub secured about said journal means and at its outer surface to the inner surface of a second hub concentric with said first hub; said torque arms respectively extending fore and aft of a respective axle from said hubs, said main frame being supported at the free ends of said torque arms.

* * * * *